Feb. 4, 1958     O. E. WOLD     2,821,956
ULTRASONIC GENERATOR
Filed March 11, 1957

INVENTOR.
Ole E. Wold, Deceased
by Leontine R. Wold,
Administratrix
by John J. Pederson
Attorney United States Patent Office 2,821,956
Patented Feb. 4, 1958

2,821,956
ULTRASONIC GENERATOR

Ole E. Wold, deceased, late of Franklin Park, Ill.; by Leontine R. Wold, administratrix, Franklin Park, Ill., assignor to Zenith Radio Corporation, a corporation of Illinois Application March 11, 1957, Serial No. 645,310

3 Claims. (Cl. 116—169)

The present invention relates to an ultrasonic generator of the general type using a longitudinal-mode mechanical resonator element to generate a signal of predetermined frequency above the sonic range.

As is well known, signals having frequencies well above the sonic range can be generated by imparting mechanical energy to a rod or the like. If the energy is imparted to the end of such a rod or resonator in the form of a sharp blow delivered by a hammer moving along its longitudinal axis, longitudinal vibrations occur at a frequency determined by the physical length of the resonator and the propagation velocity of sound in the material from which the resonator is formed. Such vibrations, normally referred to as longitudinal-mode vibrations, have an initial peak amplitude which decays exponentially with time. Normally the resonator exhibits a fundamental frequency of such value that the physical length of the resonator represents a half-wavelength. A vibrational node appears at the exact physical center of the resonator with the amplitude of particle displacement throughout the remainder of the resonator, being a function of the distance from this nodal plane to the position occupied by any particular particle in its quiescent state. Maximum particle displacement occurs at points one-quarter wavelength away from the nodal plane. Accordingly, the particles coincident with the end faces of the resonator fall in planes of maximum displacement, and maximum radiation occurs from these surfaces.

Practically speaking, it is necessary to hold the resonator in some manner if it is to be useful. Any mounting arrangement which grasps the resonator at a point where particle displacement occurs will, of course, absorb vibrational energy from the resonator causing the rate of decay of such vibration to be increased. This has the effect of damping the resonator and hence reduces its efficiency. From this it is obvious that any holding means which is to have a minimum damping effect upon the vibration must physically contact the rod at a point where there is substantially no particle motion. In a half-wavelength longitudinal-mode vibrator all of such points fall in the aforementioned nodal plane which passes transversely through the exact physical center of the resonator, and a theoretically perfect holding means is one having no thickness in the direction of the longitudinal axis of the resonator, which contacts the periphery of the resonator only within the transverse nodal plane.

At this point, it is necessary to consider a second effect introduced by many practical holding methods. Should the method chosen require the removal of material from the resonator, an unavoidable change in the resonant frequency occurs. While this is of minor importance where but a single resonator of predetermined frequency is to be constructed, it has ramifications which become increasingly important if such resonators are to be mass produced. In the single case, this effect may be readily compensated by forming the resonator to have an initial resonant frequency slightly above the desired value. The subsequent removal of material from the region of the nodal plane tends to lower the frequency; hence if the removal of material to facilitate holding the resonator has not reduced the frequency to the desired value, additional material can be removed from the nodal region in any manner desired to bring the frequency to the desired value. This same technique is, of course, applicable to mass produced resonators as well, but it involves much handling and, as a result, is expensive. Experience has shown that a preferable approach is to utilize a holding method that requires a minimum of material removal. By so doing the cumulative effects of practical manufacturing tolerances on the resonant frequency of the resonators is minimized and large quantities can be mass-produced without excessive rejects on the basis of incorrect frequency.

On the basis of these considerations, an optimum practical holding means must have minimum contact with the resonator in any region where there is particle motion if damping is to be minimized. This insures maximum conversion efficiency and minimizes the amount of mechanical energy that must be imparted to the resonator to produce vibrations having a predetermined peak amplitude and duration. The holding means must be positive and must require minimum removal of material to reduce frequency spread when such resonators are produced in large numbers by mass production techniques. Additionally, the holding means should be simple and should require no adjustment subsequent to initial assembly.

Accordingly, it is an object of the present invention to provide a new and improved ultrasonic generator of the type using a longitudinal-mode resonator for the generation of an ultrasonic signal.

It is a further object of the present invention to provide a new and improved resonator holding means for use in such generators.

It is a still further object of the present invention to provide a resonator holding means for use in such generators which is simple in construction and which has a minimum damping effect on the resonator.

It is an additional object of the present invention to provide a resonator holding means for use in such generators which provides positive support and requires a minimum removal of material from the body of the resonator.

An ultrasonic generator constructed in accordance with the present invention includes a vibratory element adapted to generate a signal of predetermined frequency by mechanical vibration in a longitudinal mode. Means for holding the element are provided and include spring wire support means including portions extending transversely about the vibrator element and retained within respective ones of a plurality of spaced transverse peripherally aligned grooves in opposite sides of the vibrator, the portions being bowed to contact the periphery of the element at a plurality of spaced discrete points, all of which are disposed in a predetermined nodal plane. This support member serves to prevent motion relative to the support member of the portion of the element coincident with the nodal plane with substantially negligent damping effect on the remainder of the element.

The features of the present invention which are believed to be novel are set forth with particularity in the appended claims. The invention, together with further objects and advantages thereof, may best be understood by reference to the following description taken in connection with the accompanying drawings, in the several figures of which like reference numerals identify like elements, and in which:

Figure 1 shows a fully assembled ultrasonic generator constructed in accordance with the present invention.

Figure 4:
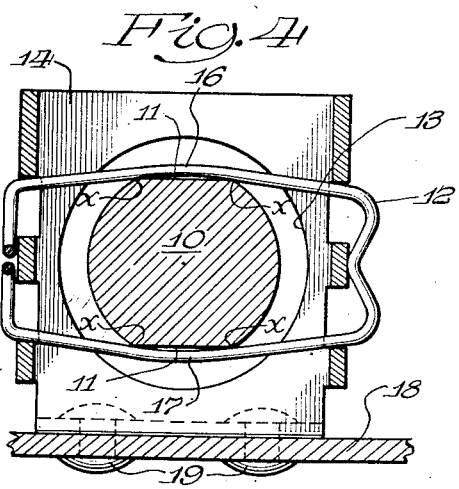
Figure 4 is a partial sectional view taken through transverse plane 4—4 of Figure 1.

The vibratory element or resonator 10 is supported within the aperture 13 of a mounting bracket 14 by a support member 12 which contacts the periphery of resonator 10 at a plurality of spaced discrete points designated "X" in the cross-sectional view of Figure 4. Each of these contact points is disposed within the central plane which passes through the vibrational node of resonator 10. By holding in this manner, relative motion between the portion of a resonator 10 coincident with the nodal plane and support member 12 is prevented with substantially negligible damping effect on the remainder of resonator 10. While any number of contact points, in excess of two, are capable of supplying the required support for resonator 10, experience has shown that, from the point of view of cost of manufacture and ease of assembly, a support member which contacts the periphery of resonator 10 at three or four spaced discrete points is most practical. Ample positional stability is accorded resonator 10 in the three-point suspension by symmetrically disposing two of the contact points on the resonator periphery relative to a transverse axis which passes through the third contact point and intersects the longitudinal axis of resonator 10, all within the nodal plane. By maintaining an arc of greater than ½π radians but less than π radians between the third point and each of the first-mentioned two points, a balance in the transverse forces acting on resonator 10 is assured. Like positional stability is provided in the four-point suspension by symmetrically disposing two of the points with respect to a transverse axis which intersects the longitudinal axis of resonator 10 all within the nodal plane. The remaining two points are disposed to constitute a mirror image of the first-mentioned points with respect to a second transverse axis drawn perpendicular to the first axis and intersecting the longitudinal axis again, all within the nodal plane. The arc between each of the first-mentioned points and the first-mentioned transverse axis can be varied through a range of greater than zero radians but less than ½π radians without causing unbalance in the transverse forces acting on resonator 10.

Figure 1:
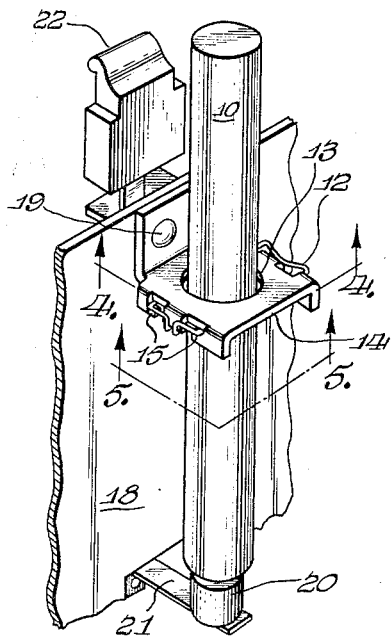
Figure 1 is a perspective view of an ultrasonic generator constructed in accordance with the present invention.
Figure 5:
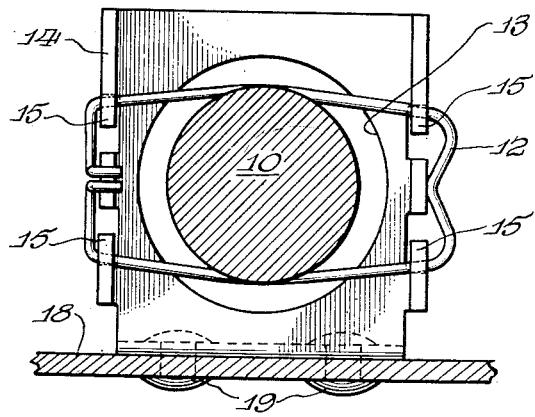
Figure 5 is a partial sectional view taken through transverse plane 5—5 of Figure 1.
Figure 3:
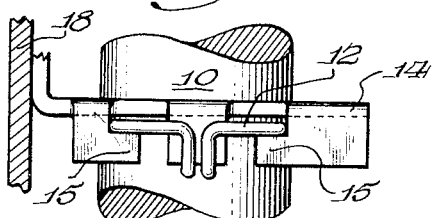
Figure 3 is a partial side view of the device of Figure 1.
Figure 2:
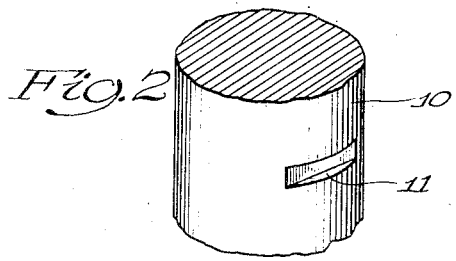
Figure 2 is a partial perspective view of the resonator of the device of Figure 1.

In the preferred embodiment of Figure 1, the vibratory element or ultrasonic resonator 10 comprises a circular rod preferably formed from a metal such as aluminum having a low internal damping factor and having a physical length which is determined by the frequency desired and the internal propagation velocity of sound. The rod contains a pair of spaced peripherally aligned shallow, transverse slots or grooves 11 which are preferably disposed at diametrically opposite points on the periphery, as shown in Figure 2. The slots are centered about the transverse nodal plane that passes through the physical center of the rod perpendicular to the longitudinal axis. The resilient support member 12, preformed from piano wire or the like, engages each of the slots and supports rod 10 within circular aperture 13 of bracket or mounting member 14. Movement of support member 12 relative to bracket 14 is prevented by lugs 15 integral with bracket 14 which engage the support member and lock it against the underside of bracket 14, as shown in Figures 3 and 5. Support member 12 is prevented from becoming disengaged from slots 11 and lugs 15 by spring bias derived from the resilient nature of the material from which it is formed.

By virtue of the deformation of the support member produced by the presence of rod 10 intermediate the parallel elements or portions 16 and 17 of support member 12, this bias is directed inwardly over the region occupied by rod 10 and outwardly in the region of lugs 15 thereby tending to lock rod 10, support member 12 and bracket 14 together as a single unit. Bracket 14 is, in turn, fastened to a base plate 18 as by means of rivets 19. A hammer 20 is mounted on a resilient strip 21 and positioned in coaxial spaced relation to one end of rod 10. Mechanism for actuating hammer 20, which is not shown but may be of the general type fully described in the copending application of Robert Adler, Serial No. 578,333, filed April 16, 1956, for Control System and assigned to the same assignee as the present application, is located on the back side of base plate 18 as viewed in Figure 1. Push-button 22 serves to actuate this mechanism, causing hammer 20 to strike the end of rod 10. By imparting mechanical energy to rod 10 in this manner, longitudinal mode vibrations are excited in the rod resulting in the generation of an ultrasonic signal of a frequency determined by the physical length of the rod and the propagation velocity of sound in the material from which it is formed.

The manner in which support member 12 holds or grasps rod 10 is of particular interest. Reference to Figure 4 shows that parallel elements 16 and 17 are deformed outwardly by the presence of the rod 10 therebetween and consequently contact the rod at four discrete points designated X, all of which lie within the aforementioned nodal plane. The inwardly directed spring bias resulting from this deformation assures the maintenance of intimate contact between the parallel elements and the rod at these discrete points. Transverse centering of the rod within aperture 13 is assured since a transverse displacement of the rod in any direction tends to unbalance the forces exerted on the rod with a resultant net force in a direction opposite to the direction of displacement. Under such conditions there is a tendency for the rod to migrate back to the position in which the forces are equal, i. e. the position in which the rod is coaxial with aperture 13.

Longitudinal motion of the rod is prevented by the engagement of parallel transverse elements 16 and 17 with the side walls of the slots 11. This is of particular importance since the rod is subjected to a longitudinal thrust each time hammer 20 strikes its end. If the slots were not provided there would be a tendency for rod 10 to move away from hammer 20 with the result that parallel support elements 16 and 17 would slide along the surface and no longer contact rod 10 within the nodal plane. Slots 11 are of a width substantially equal to or slightly greater than the diameter of the wire from which support member 12 is formed.

By forming support member 12 of resilient wire of circular cross-section, the aforementioned discrete contact points are maintained as true points, being in the form of tangents to the circular-cross section. Since slots 11 are formed of a width very nearly equal to the diameter of the wire and are centered about the nodal plane, the compressive force exerted by the parallel transverse elements 16 and 17 on the rod is restricted substantially to the portion of the rod which is coincident with the nodal plane. This is the most desirable means of supporting the rod since the particles of the rod in the immediate vicinity of the nodal plane experience little or no displacement due to vibration of the rod and hence are incapable of transferring vibratory energy to the support member. This results in minimum damping and insures maximum conversion efficiency. Any contact which exists between the parallel transverse elements and the side walls of the slots has little damping effect since there is substantially no force exerted therebetween.

With the exception of the brief period in which the side wall opposes the thrust of the hammer, all of the forces exerted on the rod are directed inwardly toward the longitudinal axis and within the nodal plane.

The slots 11 need be cut only as deep as is necessary to insure that the parallel elements 16 and 17 do not become disengaged and thereby permit the rod to drift longitudinally relative to the bracket 14. Experience has shown that slots having a depth substantially equal to or only slightly greater than the diameter of the resilient wire, from which support member 12 is formed, are totally adequate for preventing the hammer thrust from disengaging the parallel elements from the slots. This being so, the amount of material that must be removed in forming the slots is small compared with that required by more conventional holding techniques, and the net effect on the resonant frequency of the rod is minimized. This permits the mass production of such rods by normal methods without the danger of cumulative manufacturing tolerances causing excessive spread in the resonant frequencies of the rods. As a result "off-frequency" rejects are minimized without the use of costly, time-consuming frequency adjustment procedures. If extreme frequency accuracy is required for a particlar application it is, of course, possible to utilize a technique for adjusting the resonant frequency of each of the rods which is similar to that already described. The rods can be formed having an initial frequency slightly above the desired value. After the slots are cut the resonant frequency of the rod can be reduced to the desired value by the removal of additional material in the region of the nodal plane. This is most easily done by drilling a hole, of appropriate diameter and depth, which is centered about the nodal plane and directed toward the longitudinal axis of the rod. By confining the removal of material to the nodal plane, shifting of the plane is prevented since the mass on either side of the plane remains equal. This frequency adjustment method is described in greater detail and claimed in the copending application of Robert Adler, Serial No. 645,064 entitled "Ultrasonic Resonator," filed concurrently herewith and assigned to the same assignee as the present application.

In normal operation depressing push-button 22 causes the resilient strip 21 and hammer 20 affixed thereto to move downward and away from the lower end of rod 10. This motion causes energy to be stored in a spring which forms a part of the hammer actuating mechanism described in the previously mentioned copending application Serial No. 578,333. When the push-button has been depressed a predetermined distance this stored energy is suddenly released causing a resilient strip 21 and hammer 20 to move rapidly in the direction of rod 10 and to impinge upon the end of rod 10 delivering mechanical energy thereto. This energy is, in effect, initially stored in the rod and subsequently manifests itself as longitudinal-mode vibration at the resonant frequency of the rod. Since there is substantially negligible damping effect by support member 12, a major portion of this energy is radiated from the surface of the rod with the remainder being dissipated as frictional heat within the rod itself. As has been previously stated, particle displacement is a maximum at points one-quarter wavelength from the transverse nodal plane, with the result that a major portion of the radiated energy leaves the ends of the rod. This energy can be detected by appropriate apparatus and used to perform various control functions.

Figure 6:
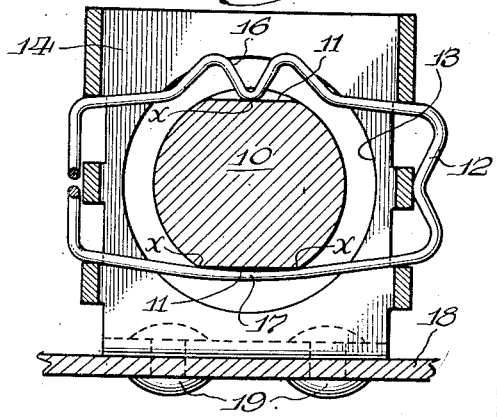
Figure 6 is a sectional view similar to that of Figure 4, of another embodiment of the invention.

While, in the preferred embodiment shown in Figure 1, the support member 12 contacts the rod 10 at four discrete points it should be understood that the three-point suspension is capable of providing a substantially equivalent result. Either of the parallel elements 16 or 17 can be formed in such a manner as to contact the rod at the midpoint of the slot rather than at the transverse extremities. Such a modification is shown in Figure 6, in which element 16 is formed with an M-shaped central portion, the central vertex of which contacts rod 10 at a single point located at the center of slot 11. Parallel element 17 is unchanged thereby resulting in a three point suspension in which the forces exerted on rod 10 are balanced and are directed toward the longitudinal axis and within the nodal plane.

The three-point configuration exhibits identically the same desirable properties as the four-point with the exception that the resultant force exerted by support member 12 on rod 10 is not as well defined should rod 10 become transversely displaced in aperture 13. Accordingly there is less tendency for rod 10 to re-center itself without the application of additional, properly directed external force.

While a single resonator has been shown in Figure 1, it is obvious that any number of resonators and actuating assemblies can be mounted on base plate 18. If each of the resonators is formed having a resonant frequency different from the others the resultant composite generator can be used to supply a plurality of discrete predetermined frequencies in the ultrasonic range thus making it useful for initiating a multiplicity of control functions.

By using the technique of the present invention in supporting the longitudinal mode resonator of an ultrasonic generator, damping of the ultrasonic vibrator by the support member is substantially reduced with respect to that experienced with more conventional techniques. The desired positional stability of the resonator is accomplished with minimum contact between the surface of the resonator and the support member. By requiring a minimum of material removal from the resonator in the region of contact between support member and resonator, mass production techniques can be applied without excessive frequency spread resulting from cumulative manufacturing tolerances. The overall assembly is structurally simple requiring no special manufacturing or assembly techniques to insure satisfactory results.

A resonator mount constructed in accordance with the present invention can be used to advantage with hammer actuating mechanisms of the type fully described and claimed in the copending application of Robert Ehlers and Clarence W. Wandrey, Serial No. 645,091 entitled "Ultrasonic Transmitter," filed concurrently herewith and assigned to the same assignee as the present invention.

While particular embodiments of the invention have been shown and described, it is apparent that modifications and alterations may be made, and it is intended in the appended claims to cover all such modifications and alterations as may fall within the true spirit and scope of the invention.

What is claimed is:

1. In a transmitter for generating ultrasonic signals at a predetermined frequency: an elongated vibrator resonant in a longitudinal mode at said predetermined frequency and having a plurality of spaced transverse peripherally aligned grooves in opposite sides of said vibrator in a predetermined nodal plane; a mounting member; and spring wire support means for resiliently holding said vibrator on said mounting member, said support means comprising portions extending transversely about said vibrator and retained within respective ones of said grooves, said portions being bowed to contact said vibrator at a limited number only of discrete points spaced about the periphery of said vibrator.

2. The transmitter defined in claim 1 in which said portions are of circular cross-section.

3. In a transmitter for generating ultrasonic signals at a predetermined frequency: an elongated vibrator resonant in a longitudinal mode at said predetermined frequency and having a plurality of spaced transverse peripherally aligned grooves in opposite sides of said vibrator in a predetermined nodal plane; a mounting member, and spring wire support means for resiliently holding said vibrator on said mounting member, said support means comprising portions extending transversely about said vibrator and retained within respective ones of said grooves; said portions being bowed outwardly, with the respective adjacent sections thereof external of said grooves being spaced apart by a distance less than the distance between said grooves, to contact said vibrator at a limited number only of discrete points spaced about the periphery of said vibrator.

References Cited in the file of this patent
UNITED STATES PATENTS

| | | |
|---|---|---|
| 1,994,560 | Brewer | Mar. 19, 1935 |
| 2,068,629 | Miller | Jan. 19, 1937 |
| 2,728,902 | White | Dec. 27, 1955 |

OTHER REFERENCES

Popular Mechanics, October 1956, p. 153